Inventors
Frederick Williams
Harold Glenn Bowditch
By
Attorneys

Inventors
FREDERICK WILLIAMS
HAROLD GLENN BOWDITCH
By
Norris & Bateman
Attorneys

United States Patent Office 3,107,921
Patented Oct. 22, 1963

---

3,107,921
AGRICULTURAL MACHINE
Frederick Williams and Harold Glenn Bowditch, Leigh, England, assignors, by mesne assignments, to Harrison, McGregor & Guest Limited, Leigh, England
Filed Apr. 28, 1959, Ser. No. 809,502
Claims priority, application Great Britain May 3, 1958
8 Claims. (Cl. 275—1)

The invention relates to agricultural machinery, and has for its object to provide a new or improved machine which will be capable of performing a multiplicity of tasks, and particularly the handling of silage and manure.

The present practice in handling these materials is to employ a number of specialised machines in their gathering or loading, transport, and distribution or unloading, for example mowing machines, pick-up balers, forage harvesters, loaders, buckrakes, trailers, manure spreaders and the like. Hand labour is also required.

According to the invention, an agricultural machine comprises a load-carrying body, means for moving a load towards an open end of said body, a laterally-extending power-driven shaft located outside but adjacent said open end and provided with a plurality of flails, and deflector means adjustable in position with respect to said shaft. Preferably, the flail-carrying shaft is moveable between a position near ground level and another position substantially above ground level, without affecting the drive to the said shaft. The deflector means or a part thereof may be removable from the machine, and the flails may advantageously be universally connected to their shaft.

Means will preferably be provided for regulating the volume of a load moveable towards the open end of the body, and the said means may comprise a tined power-driven shaft or shafts, extending laterally across the body near the open end thereof at a suitable height above the floor of the body, and rotatable in such direction that the tines move away from the said open end during the lower part of their travel. Preferably, also, the means referred to for moving a load towards the open end of the body will comprise a conveyor overlying the floor of the body, and may be operable at speeds variable down to zero.

A preferred embodiment of the invention will now be described by way of example only, with reference to the accompanying drawings in which:

FIGS. 2, 3 and 4 are drawn on a slightly larger scale than FIG. 1.

Figure 1:
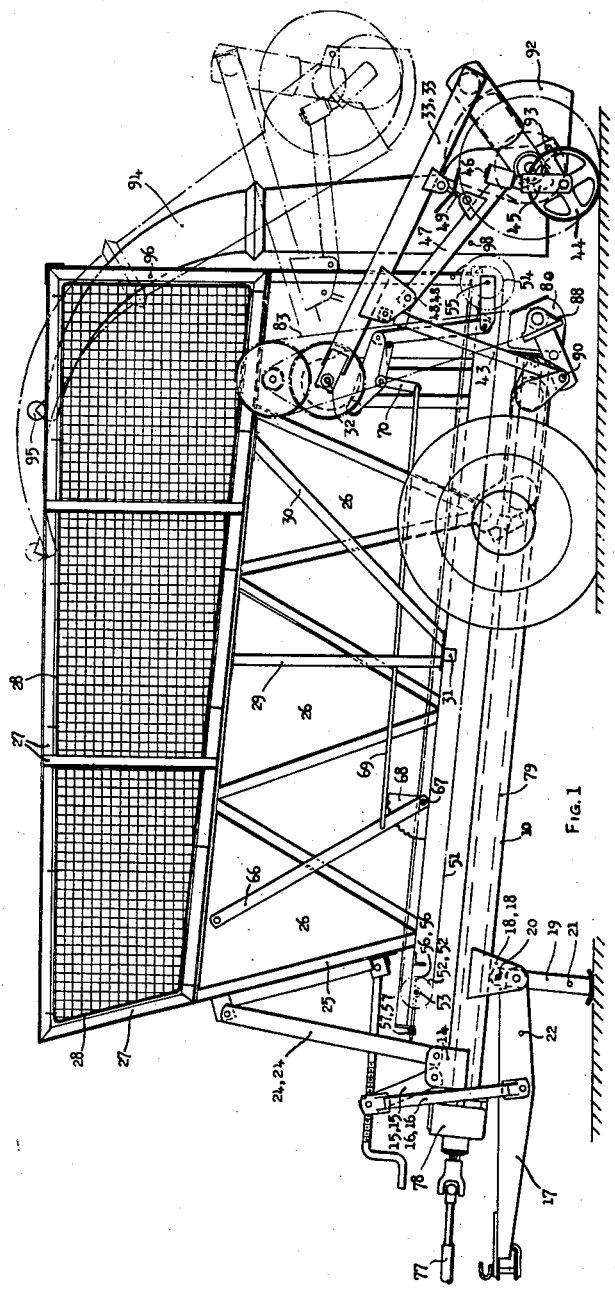
FIG. 1 is a side elevation of an agricultural machine according to the invention.

Referring now to the drawings, a main frame comprises a forwardly and rearwardly extending tubular member 10 having transversely extending tubular members 11, 12 welded to it near its rearward end. The said main frame is supported near its rearward end on a pair of pneumatic tyred wheels 13, 13. It is further provided at its forward end with a bracket 14 which pivotally supports the lower ends of a pair of short links 15, 15. The other ends of the said links are pivotally connected to the upper ends of a pair of struts 16, 16, the lower ends of which are pivotally connected to a drawbar 17, the rearward end of said drawbar being pinned between a pair of lugs 18, 18 welded beneath the frame.

A support leg 19, on to which the machine may be lowered when it is uncoupled from a tractor by which it is normally trailed, is also pinned between the lugs 18, 18. The said leg is locked in the position shown in FIG. 1 of the drawings by means of a peg 20 inserted through aligned holes in the lugs 18, 18 and in an extension of the leg. Whilst the machine is coupled to a tractor and the leg 19 is consequently not in use, it is retained in an inoperative position between the sides of the drawbar, which is substantially of inverted U-section, by the peg 20 which is withdrawn from the position shown in FIG. 1 of the drawings and inserted through holes 21 and 22, in the leg and drawbar respectively, which are brought into alignment. A load-carrying body is supported on said main frame by means of a pair of upstanding lugs 23, 23 (FIG. 2) welded one at each end of the frame member 11, and a pair of diverging struts 24, 24 bolted to the bracket 14 welded on the forward end of the frame member 10. Said body comprises an upper and a lower portion, the lower portion having a floor indicated at F in FIGURE 3, two side walls and a front end wall, constructed of angle sections 25 bolted together to form a skeleton on which are fastened steel plate members 26, and the upper portion comprising a pair of side members and a front end wall constructed of angle sections 27 supporting wire mesh panels 28. The side walls of the lower portion of the body are braced by means of inclined struts 29 and 30, the lower ends of which are fixed at the ends of an outrigger 31 which projects laterally beyond each side wall. The body has no rear wall.

Figure 4:
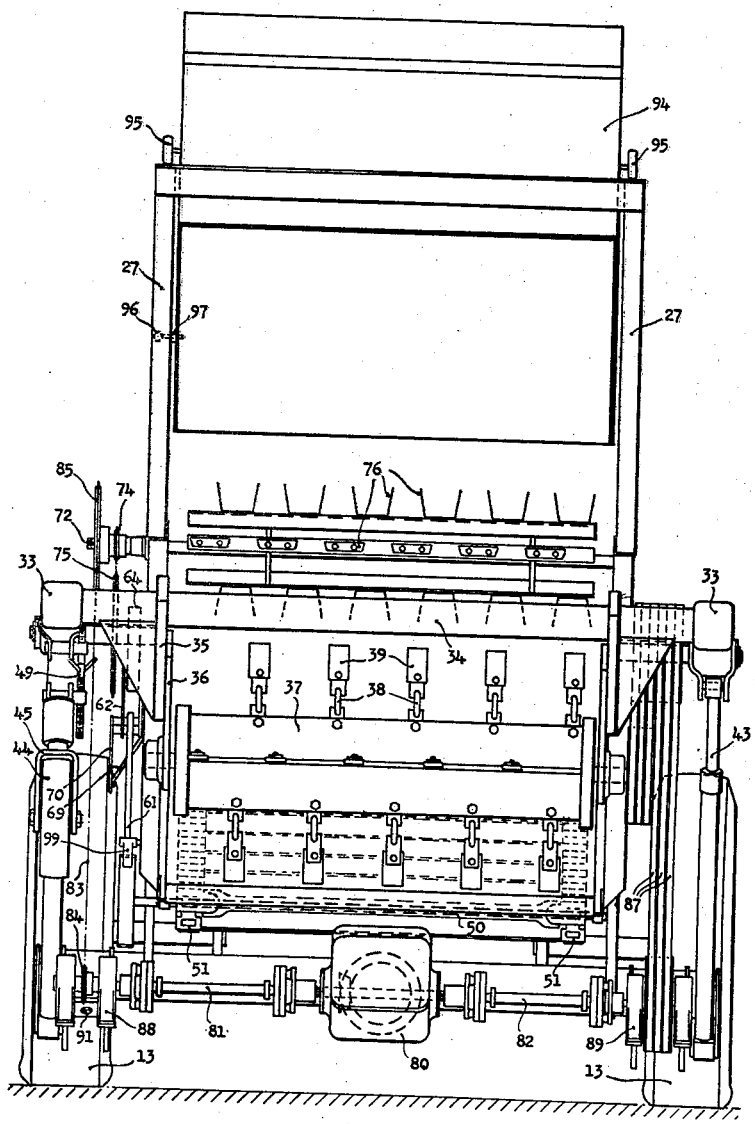
FIG. 4 is a rear elevation of the machine.

A pair of aligned stub shafts 32, 32 are carried by the lower portion of the load-carrying body, and extend outwards from opposite side walls thereof. Pivotally mounted one on each of the said stub shafts are the forward ends of a pair of arms 33, 33, the rearward ends of which extend to the rear of the load-carrying body. The said rearward ends are rigidly connected to the respective ends of a member 34 extending transversely across the rear of the machine, said member having fixed to it a pair of laterally-spaced plate members 35, 35 to which are bolted a pair of support arms 36, 36. The said support arms carry between them a rotatable longitudinally-finned shaft 37 on which are universally mounted, by means of chain links 38, a plurality of circumferentially- and axially-spaced flails 39, see FIG. 4. The said shaft 37 and flails 39 comprise a so-called "flail cylinder" such as is well-known in forage harvesting machines. Said flail cylinder is adapted to be rotated at very high speed (for which purpose it is dynamically balanced in known manner) by means of a V-pulley 40 and multiple V-belts 41. Drive is transmitted to said V-belts by means of a pulley 42 rotatable on the right hand (when viewed from the rear) stub shaft 32 such that raising or lowering of the arms 33, 33 will not affect the centre distance between the pulleys.

Co-ordinated pivotal movement of the arms 33, 33, to raise or lower the flail cylinder, is effected by a pair of hydraulic ram and cylinder assemblies 43, 43, which are operated by oil supplied from the hydraulic system of the tractor by conventional valve and conduit means (not shown). A ground-engaging caster wheel 44 is provided to allow fine adjustment of the cutting height of the flail cylinder and to cause the latter to follow closely the contour of the ground. Said caster wheel 44 is carried by a forked bracket 45 freely pivotable about an axis 46 at the rearward end of a depending arm 47 pivotally connected at its forward end between a pair of lugs 48, 48 welded beneath one of the arms 33, and the said wheel is adjustable relative to the flail cylinder by means of a winged screw 49 adapted to vary the angular relationship between the depending arm 47 and the arm 33.

The machine is provided with a conveyor which comprises a plurality of laterally disposed slats 50 extending between endless chains 51, 51. The said chains pass over respective idler sprockets 52, 52 fixed to a shaft 53 extending laterally beneath the forward part of the load-carrying body, and over respective driving sprockets 54, 54 fixed to a shaft 55 extending laterally beneath the rearward part of said body. The arrangement is such that a section of the said conveyor overlies the floor F of the body and is moveable rearwardly with respect to said floor, whilst the return section of the conveyor is arranged to pass beneath the floor. A transverse slot (not shown) in the front end wall of the lower portion of the body allows the conveyor to pass from the idler sprockets into the body portion. The centre distance between the shaft 53 carrying the idler sprockets 52, 52 and the shaft 55 carrying the driving sprockets 54, 54 can be varied to take up slack in the conveyor, and this is effected by adjusting the position of a pair of laterally spaced bearing brackets 56, 56 which carry the shaft 53. These brackets, which are bolted beneath forwardly projecting extensions of the angle sections forming the floor of the load-carrying body, can be readily adjusted by slackening clamping bolts (not shown) which pass through longitudinal slots (not shown) in said extensions, and utilising screwed adjusting devices 57, 57 to displace said brackets. The clamping bolts are then re-tightened. The driving sprockets 54, 54 which are fixed on the shaft 55 are adapted to be driven intermittently by means of a ratchet wheel 58 and pawl 59. The pawl is carried by an arm 60 pivoted on the shaft 55 and connected by means of a link 61 to a rocking member 62 carrying a follower 63 which co-operates with a spiral edge cam 64 rotatable on the left hand (when viewed from the rear) stub shaft 32. The follower 63 is urged into contact with the cam 64 by a tension spring 65 connected to the rocking member 60 and anchored to the load-carrying body. A pawl 99 is pivotally mounted on the load-carrying body and functions to prevent reverse rotation of the ratchet wheel 58.

A hand lever 66, pivoted near the front of the body at 67, is operable to vary the rate of feed of the conveyor or to stop it completely. Said lever is provided with a conventional locking device (not shown) by means of which it can quickly and easily be locked in adjusted angular position relative to a fixed segment 68, and a rod 69 connects the said lever to a bell crank lever 70 pivotable about a pin 71 on which the rocking member 62 is also pivotable. The bell crank lever can be so adjusted that the said rocking lever is prevented from moving under the action of the spring 65, through any part or the whole of the angular distance allowed by the intermittent recession of the periphery of the cam 64, and the follower 63 carried by the rocking member 62 is thus held clear of the cam for any part or the whole of the rotation thereof. The motion imparted to the pawl 59 can thus be varied or arrested, in order to control the rate of feed of the conveyor in a substantially infinitely-variable manner.

The said cam 64 receives drive from a shaft 72 which extends across the body, by means of an endless chain 73 engaging a sprocket 74 on said shaft and a relatively larger sprocket 75 fixed to said cam. The shaft 72 carries a plurality of axially- and circumferentially-spaced rigid tines 76 (FIG. 4), and is adapted to be rotated such that at the lowest point of their travel the said tines move away from the open end of the body.

Power is transmitted to the various driven parts of the machine from the power take-off shaft of a tractor by which the machine is towed, by means of a universally jointed shaft 77, a combined overrunning and overload release clutch 78, a tubular drive shaft 79 passing through the tubular member 10 of the main frame, and bevel gearing housed in a gearbox 80 mounted on the rearmost end of the member 10. The clutch 78 cuts off the drive to the machine under conditions of overload, for instance if the flail cylinder becomes clogged, and also overruns when the said drive is discontinued in order that the kinetic energy stored in the rotating flail cylinder cannot be transmitted back to the tractor. The gearbox 80 has a pair of output shafts 81 and 82 provided with flexible couplings of well-known type to allow mis-alignment in the drives.

The output shaft 81 is adapted to drive the tined shaft 72 and thus the spiral edge cam 64, by means of an endless chain 83 which engages a sprocket 84, driven by said shaft 81, and a relatively larger sprocket 85 fixed on said tined shaft 72. The output shaft 82 is adapted to transmit drive to the flail cylinder by means of a V-pulley 86 driveably connected to the V-pulley 42 by means of multiple V-belts 87.

The sprocket 84 is rotatably mounted in a bracket 88 supported by the left hand end (viewed from the rear) of the tubular member 12 of the main frame. Similarly, the V-pulley 86 is rotatably mounted in a bracket 89 supported by the right hand end (viewed from the rear) of the tubular member 12. The brackets 88 and 89 are independently adjustable in position about respective anchorages 90, 90 by means of screws 91, 91, so that the correct centre distance between the sprockets 84 and 85 can be maintained and so that the correct tension can be maintained in the V-belts 87.

Figure 3:
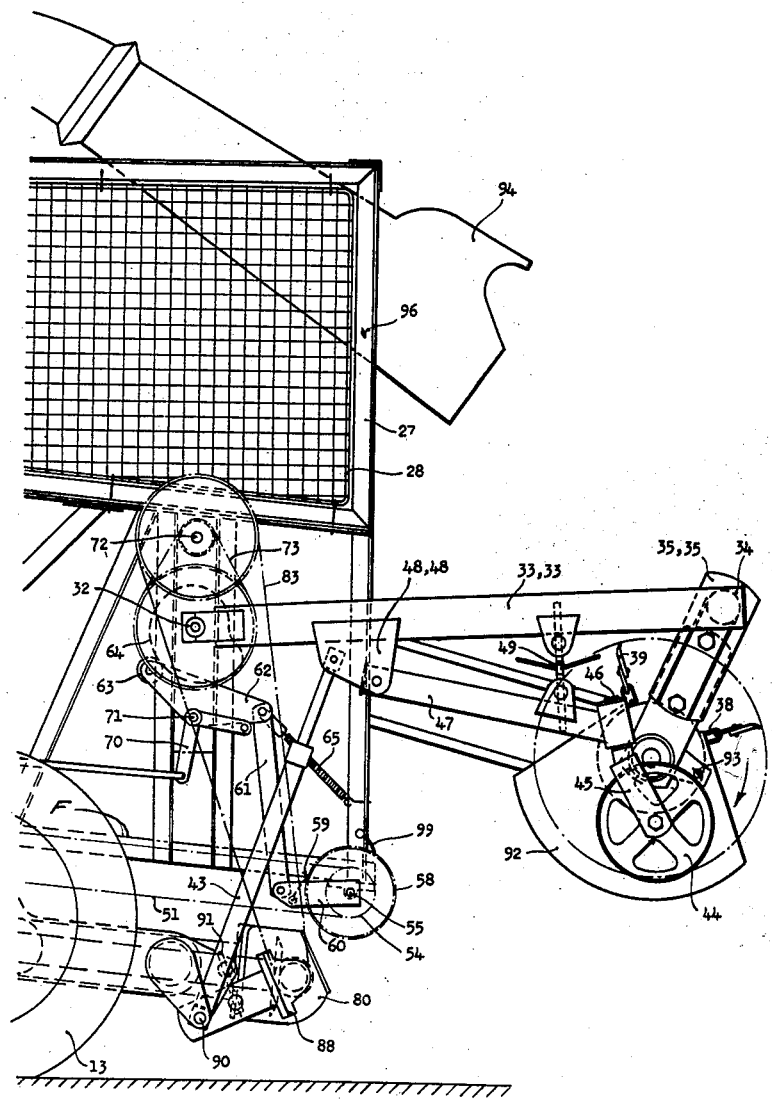
FIG. 3 is a detail view showing the drive to the conveyor with the deflector means raised into an inoperative position.

The machine is provided with deflector means comprising two main portions each of which is adjustable in position independently of the other. One of these is a shroud for the flail cylinder and comprises a part cylindrical cover 92 shrouding approximately 90° of the periphery of the cylinder of revolution of the flails. The said cover is adjustable into various positions about the flail cylinder by means of a peg 93 inserted into the appropriate one of a number of angularly-spaced holes (not shown) in the left hand end (viewed from the rear) of the said cover and into a hole in the adjacent support arm 36. The other portion is a delivery chute 94 which comprises a forwardly curved and slightly tapered passage of a width slightly less than the width between the side walls of the body, and a height of approximately the full height of the vehicle. The lower end of the chute is adapted to co-operate with the flail cylinder mounting in such manner that it may be positioned over the flail cylinder, whilst its upper extremity is provided with a pair of rollers 95, 95 which are adapted to rest on the angle sections 27 forming the upper edge of the side walls of the body. The said rollers can run along said angle sections 27 when the hydraulic ram and cylinder assemblies 43, 43 are operated to raise or lower the flail cylinder, as shown in ghosted outline in FIG. 1. The lower rear wall of the chute is cut away so as to accommodate the part cylindrical cover 92 which is an easy sliding fit between the side walls of said chute, whilst the upper front wall of the chute is also cut away to allow free access into the load-carrying body of material delivered through the chute. The chute may be retained in an inoperative position, as shown in FIG. 3, by means of a peg 96 slideable in a boss 97 welded to the rear of the upper portion of the body, and adapted to engage a hole 98 in one side of said chute.

Figure 2:
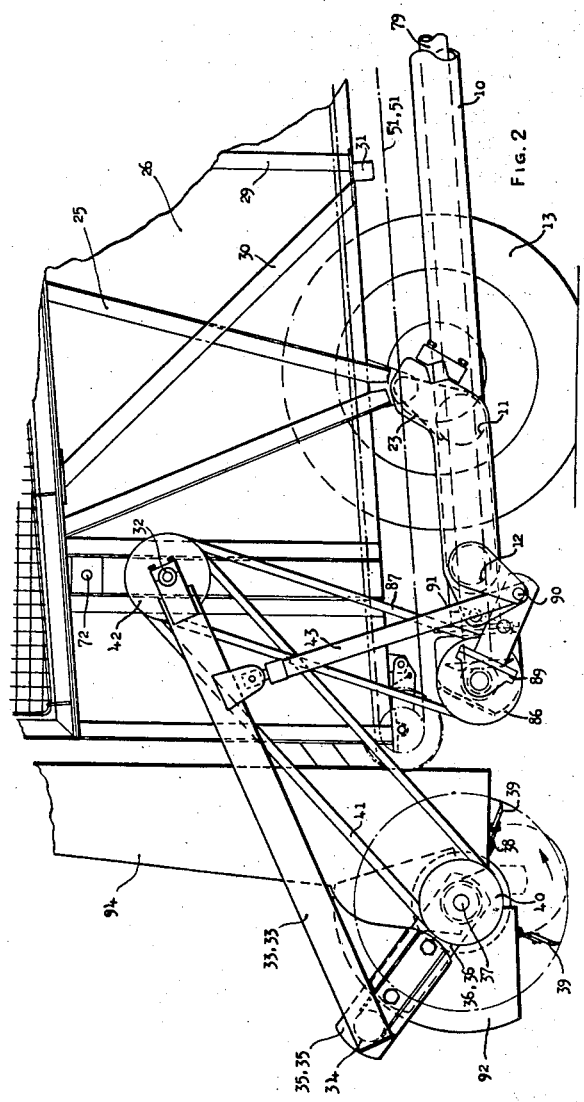
FIG. 2 is a detail view showing the drive to the flail-carrying shaft.

The operation of the machine is as follows:

When cutting and loading silage crops the chute 94 is engaged with the flail cylinder mounting and the part cylindrical cover 92 is secured in the position shown in FIGS. 1 and 2 of the drawings. The flail cylinder is lowered into a position very close to the ground, determined by the setting of the caster wheel. The cam follower 63 is withdrawn from the profile of the edge cam 64 by operation of the hand lever 66 so that the conveyor will remain stationary during the gathering operation. The power take-off shaft of the tractor vehicle is caused to rotate, and as the trailer is towed forwardly the flails, rotating in the direction of the arrow shown in FIGURE 2 cut the crop and project it up the chute 94 and into the trailer body.

The crop may be unloaded into a silo in either of two ways. The flail cylinder, together with the chute 94, may be raised into an inoperative position, whereupon the conveyor may be caused to move at its highest speed when the power take-off shaft of the tractor is rotated, to carry the crop towards the open end of the body and to tip it out of said body into the silo. Alternatively, the said chute may be retained in its raised and inoperative position whilst the flail cylinder is lowered into substantially the same position as that for cutting a crop, the part cylindrical cover 92 being positioned relative to the flail cylinder in the position shown in FIG. 3 of the drawings. If the conveyor is then caused to move rearwardly at a suitable speed when the power take-off shaft of the tractor vehicle is rotated, the load is carried towards the open rear end of the body where it is impelled by the flails into the silo when the flail shaft 37 is rotated in the direction indicated by the arrow shown in FIGURE 3. The selection of a suitable conveyor speed, and the action of the tined shaft 72 in regulating the volume of material carried towards the open rear end of the body by throwing excess material back towards the front thereof, ensure that the flail cylinder will be able to deal with the crop and will not become choked. The last mentioned method of unloading is particularly suitable where the load is to be discharged into a long and narrow silo.

When loading manure from a heap, the chute 94 is again engaged with the flail cylinder mounting but the part cylindrical cover 92 is located at the lower front side of the flail cylinder as shown in ghosted outline in FIG. 1 of the drawings. The conveyor is again caused to remain stationary when the power take-off shaft of the tractor is caused to rotate, and the hydraulic ram and cylinder assemblies 43, 43 are operated to raise the flail cylinder to a position approximately level with the top of the manure heap. The vehicle is reversed into close proximity to the manure heap, and the flail cylinder is then lowered either by the tractor driver operating a valve on the tractor (not shown) or by an operator standing alongside the load-carrying vehicle and controlling an auxiliary valve (not shown) mounted on said vehicle. A slice of manure is thus removed from the heap, and projected into the body, the thickness of the slice being limited by the distance that the flail cylinder extends rearwardly from the rearmost edge of the part cylindrical cover 92. Repeating this operation, and moving the vehicle rearwardly a short distance between each cutting stroke, will quickly fill said body with manure.

To clear the ground of loose manure in the vicinity of the heap, the rotating flail cylinder is lowered to a position just clear of the ground. With the part cylindrical cover 92 disposed at the lower front side of the flail cylinder in such manner that one edge of said cover just skims the ground, the machine is then reversed and loose material is thus gathered up. This method of loading is also adopted if the manure heap is a very low one.

To spread the loaded manure in a field, the chute is again locked in its raised inoperative position and the flail cylinder is lowered, the shroud remaining at the lower front side of said cylinder. The lever 66 is then adjusted into a position in which the conveyor is moved at a suitable speed when the power take-off shaft of the tractor is caused to rotate. As the machine is towed forwardly by said tractor, therefore, a volume of manure regulated by the tined shaft 72 is moved towards the open rear end of the body where it is distributed over the ground by the rotating flails.

When it is desired to pulverise haulms, maize stalks, bracken and the like, the part cylindrical cover 92 is positioned substantially above the flail cylinder and the machine is towed forwardly with the said flail cylinder rotating in lowered position governed by the caster wheel 44. The growth is thereby cut, pulverised, and deposited back upon the land. During this operation, the chute 94 may be maintained in its raised inoperative position or it may if preferred be engaged with the flail cylinder mounting. The conveyor will preferably be made inoperative, however.

Other operations which can be performed include the loading of silage from a silo in exactly the same manner as manure is loaded from a heap; unloading the silage at the point of feeding by operating the conveyor with the flail cylinder held in raised, inoperative position; clearing litter from roads and parks; removing packed ice from roads; and clearing weeds. It will be appreciated that in carrying out the three last-mentioned operations the arrangement is the same as for cutting and loading silage crops, and there is thus a great advantage in that everything acted upon by the flails, including weed seeds, is impelled into the trailer body and can be effectively destroyed. Light earth moving and grading might also be possible if the caster wheel is so adjusted that the rotating flails enter the ground to a depth at their lowest point of a few inches only, the arrangement being otherwise the same as for cutting and loading silage crops.

Whilst the foregoing description refers only to a trailed machine having its working parts powered by the towing vehicle, it should be clearly understood that a machine may be arranged to be trailed but have its working parts powered by an independent engine, or to be completely self-propelled, or even to be detachably mounted bodily on an engine-driven vehicle with its working parts powered thereby or by an independent engine, and also that numerous other modifications may be made, without departing from the scope of the invention.

What we claim is:

1. An agricultural machine comprising a load carrying body having an open end; a flail assembly including a power driven shaft, means mounting said shaft laterally on said body outside but adjacent the open end of said body, and a plurality of longitudinally spaced flails carried by said shaft; means for guiding into said body material projected by said flails comprising a chute and a deflector surface, said chute having an open lower inlet end and a remote upper outlet end positioned to discharge material into said body and being disposable in a position where said inlet end is located at least partially over said flails for receiving material projected therefrom, said deflector surface shrouding said flails longitudinally of said shaft in a predetermined loading position to guide said material into said inlet end of said chute and leaving a rearwardly facing peripheral portion of said flail assembly exposed for engagement with the material to be loaded, means for adjustably moving said deflector surface to a position above said flails to expose the lower peripheral portion of said flail assembly to enable said flails to cut crops on the ground, and means for unloading said body comprising means on said body for moving material therein through said open end, means for raising and lowering said shaft and said deflector surface as a unit between positions located at various levels with respect to the ground while maintaining power drive to said shaft, said deflector surface being adjustably movable through an angle from said position above said flails to a location below said flails to expose the upper peripheral portion of said flail assembly for discharging material moved through said open end.

2. The agricultural machine defined in claim 1 wherein said body is formed with a floor and wherein said means for moving material toward said open end comprises an endless conveyor, a section of which overlies said floor; and power means on said body for selectively actuating said conveyor and said shaft.

3. The agricultural machine defined in claim 2 comprising an over-running and overload release clutch operatively interposed in the drive between said power means and said shaft.

4. An agricultural machine comprising a load carrying body; and means for projecting material into said body comprising a laterally extending power driven shaft mounted on said body adjacent but outside one end thereof, a plurality of longitudinally spaced flails carried by said shaft, and a delivery chute having an open lower inlet end and a remote upper outlet end positioned to discharge into said body, means for raising and lowering said shaft between operative positions located at different levels with respect to said body, and means mounting said chute on said body for movement independently of said shaft between a lower position where said inlet end is located over said flails to receive material projected by said flails and an upper position wherein said inlet end is above and remote from said flails.

5. In the agricultural machine defined in claim 4, a shroud angularly adjustable about said shaft to co-operatively fit with the inlet end of said chute in the lower position.

6. An agricultural machine comprising a load-carrying body having an open end; means for moving a load towards an open end of said body to unload same; a laterally extending tined driven shaft located within said body at said open end above said load moving means to regulate the volume of material moved by said means through said open end; and means for cutting a growing crop and for projecting it into said body, said means comprising a laterally extending driven shaft mounted on the body outside but adjacent said open end and a plurality of flails carried by said shaft; and means on said body for driving said driven shafts.

7. In an agricultural machine, a load carrying body having a floor and an open rear end; an endless conveyor on the floor of said body having a discharge end at said body rear end; means on the body co-operating with the discharge end of said conveyor for regulating the volume of material discharged by said conveyor; means for cutting a growing crop and for projecting it into said body comprising a flail cylinder at the rear of said body mounted for movement between a lower position adjacent the ground and a raised position above the level of the body floor; and drive means for said conveyor, volume regulating means and flail cylinder having a connection at the front end of the body for coupling to a power take-off of a tractor or the like.

8. An agricultural machine comprising a body having an open rear end and a drive shaft running longitudinally from front to rear to terminate in a gear box adjacent the body rear, a transverse power shaft drive connected to the gear box, a rearwardly extending frame pivoted to the body on the axis of said transverse power shaft, a transverse flail carrying shaft on said frame drive connected to said transverse power shaft, a longitudinally extending conveyor on said body drive connected to said transverse power shaft, and a transverse tined shaft on said body located above the level of said transverse power shaft at the rear end of said body and drive connected to said transverse power shaft.

References Cited in the file of this patent

UNITED STATES PATENTS

| | | |
|---|---|---|
| 1,076,061 | Quenner | Oct. 21, 1913 |
| 1,125,122 | Koenig | Jan. 19, 1915 |
| 1,346,433 | Varland | July 13, 1920 |
| 1,463,492 | Varland | July 31, 1923 |
| 1,900,213 | Wenberg | Mar. 7, 1933 |
| 1,979,945 | Kranick | Nov. 6, 1934 |
| 2,256,815 | Raney | Sept. 23, 1941 |
| 2,597,052 | Barker | May 20, 1952 |
| 2,699,337 | Best | Jan. 11, 1955 |
| 2,766,075 | Skromme et al. | Oct. 9, 1956 |
| 2,882,667 | Brady | Apr. 21, 1959 |
| 2,886,333 | Harris | May 12, 1959 |
| 2,900,193 | Harriott | Aug. 18, 1959 |
| 2,952,465 | Skromme | Sept. 13, 1960 |

FOREIGN PATENTS

| | | |
|---|---|---|
| 299,827 | Germany | Aug. 11, 1917 |
| 833,723 | Germany | Mar. 10, 1952 |
| 284,010 | Switzerland | Nov. 1, 1952 |